Oct. 28, 1952  B. G. WOOLLEY  2,615,468
DIAPHRAGM CONTROLLED VALVE WITH BELLOWS TYPE SEAL
Filed May 16, 1947
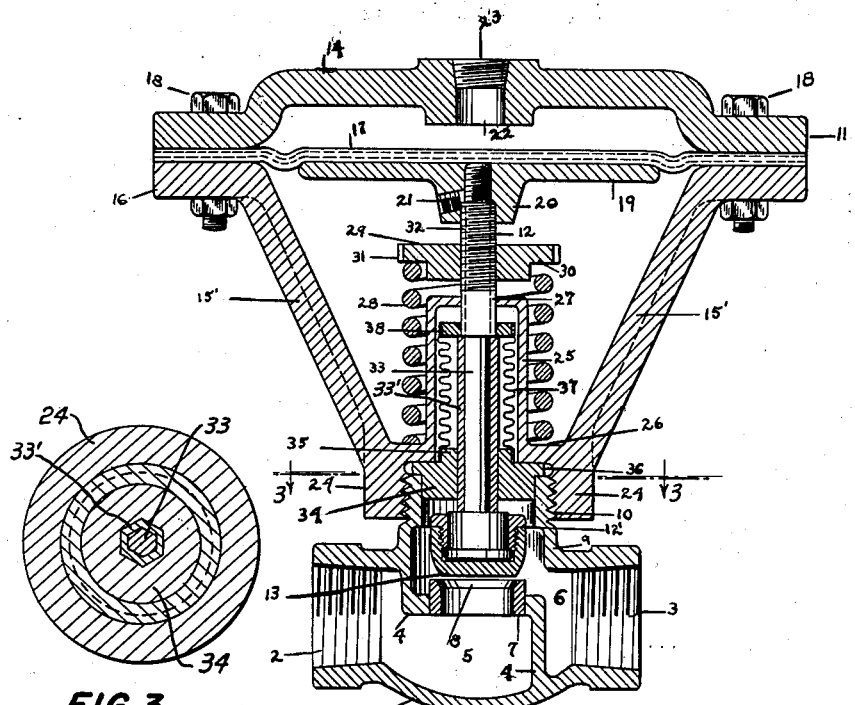
FIG. 3
FIG. 1
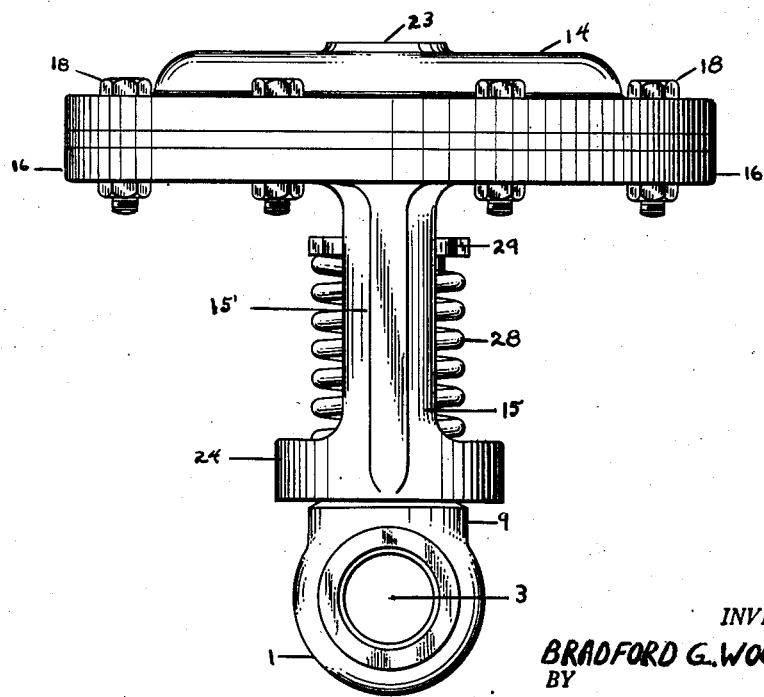
FIG. 2
INVENTOR.
BRADFORD G. WOOLLEY
BY
Raymond J. Norton
ATTORNEY Patented Oct. 28, 1952

2,615,468

UNITED STATES PATENT OFFICE 2,615,468

DIAPHRAGM CONTROLLED VALVE WITH BELLOWS TYPE SEAL

Bradford G. Woolley, Providence, R. I., assignor, by mesne assignments, to Reconstruction Finance Corporation, Boston, Mass., a corporation of the United States Application May 16, 1947, Serial No. 748,552

4 Claims. (Cl. 137—688)

This invention relates to an improved control valve assembly, more particularly to a novel type of packless motor valve.

In the past, the art has recognized the advantages derivable from the use of the bellows sealed packless type of control valve. In many industrial uses which demand a positive leak-proof seal for the sliding surfaces of the valve unit the conventional stuffing box or gland type of seal is ineffective and the bellows type of seal is necessary if efficient valve operation is to be attained. Illustrative of such uses are those which involve the control of highly volatile, inflammable or toxic materials which constitute a starting material, reactant intermediate or end product in synthetic chemical processes. A notable example of the necessity of a truly leak-proof valve structure is encountered in refrigeration circuits in which high vapor pressure organic refrigerants are employed.

Heretofore such packless valves have comprehended a wide variety of specific designs. Considered generally, they involve a structure in which a bellows type seal is secured at one end to the valve stem, or a part movable therewith, and at the other end to a fixed sleeve or other form of non-reciprocating guide for the stem to thereby establish a fluid tight seal between the stem and the valve body.

In all such earlier structures the bellows seal was connected on the one hand with a tubular valve stem and on the other with a non-reciprocating stem guide which was similarly circular or tubular in cross-section to conform to the cross-sectional shape of the reciprocating stem. Such prior structures presented serious inherent disadvantages. As is known, in the assembling, dismantling and maintenance of the valve unit there are many occasions when an extraneous torsional stress is applied to the stem either directly or indirectly. For example, during use a valve plug may become frozen to its seal as, for example, by reason of the accumulation of cementitious deposits. In such circumstances it is not uncommon procedure for the workman to apply a torsional stress to the valve stem, by means of a Stilson wrench or other tool, in order to break the cementitious bond and free the plug. Again, in certain of the prior valve structures, adjusting nuts, such as spring adjusting nuts, are threaded on the valve stem. Oftentimes when such nuts become tightly bonded or adhered to the stem by reason of corrosion or other causes, application of the torsional stress to the nut tends to twist the valve stem itself. Such torsional movement of the stem relative to the fixed circular guide, if of sufficient magnitude or if sufficiently recurring, will tend to disrupt the seal either by fracturing the joint between the bellows and the stem, or between the bellows and the non-reciprocating guide. In extreme cases the metallic bellows itself may be fractured.

The present invention is based on the concept of devising a valve structure, embodying a bellows seal, in which any such undesirable relative torsional or twisting movement between the valve stem and a non-reciprocating seal attachment for the bellows is positively precluded. A preferred embodiment of the invention also comprehends the concept of mounting the bellows within a protected or sheltered portion of the motor valve superstructure and in nested position relatively to the valve spring to thus insure an eminently compact, light and rugged structure of low height or silhouette.

In order to enable a more ready comprehension of the invention a typical illustrative embodiment incorporating the essential principles is shown in the accompanying drawing, in which:

Fig. 1 is a vertical cross-section of the improved valve unit;

Fig. 2 is a side elevation of such unit; and

Fig. 3 is a sectional view taken substantially along lines 3—3 of Fig. 1.

In the drawings, the numeral 1 designates a valve casing or housing of any suitable ferrous or non-ferrous alloy having an inlet 2 and an outlet 3. The valve body is formed with the partition 4 which divides the valve body into an inlet chamber 5 and an outlet chamber 6. The central horizontal section of the partition is apertured to receive the ring 7 formed with the beveled valve seat 8. The ring may be secured in position in the valve body in any desired manner as by a press frictional fit or by a screw threaded connection. Communication between the inlet and outlet chambers is thus established by the passage or port defined by the ring 7. The valve body is formed with the integral tubular extension 9 which is exteriorly threaded at 10 to connect it with the valve superstructure.

As shown, the superstructure comprises a motor designated generally by the numeral 11 which is associated with the valve stem 12 the lower end of which is formed with the enlarged threaded head 12' to which is secured the detachable and replaceable plug 13. The plug functions to open or close the valve port on the reciprocation of the valve stem 12. Considered more in detail the motor structure includes the upper diaphragm dish-shaped casing 14 and a lower diaphragm body or intermediate support unit 15. This latter, as will be observed, is formed with the continuous circumferential flange 16 which is of the same diameter as the casing 14. Preferably, the lower diaphragm support unit is formed of spaced inwardly tapered diametrically positioned sections 15', as shown in Fig. 2, so as to permit ready access to the valve stem for assembling, dismantling or servicing. The wall sections, as shown, may be formed with integral ribs to increase the strength and rigidity of the structure. A diaphragm 17 is tightly secured between the flange 16 and the upper diaphragm casing by suitable means such as by the bolts 18. The diaphragm may be composed of any suitable flexible, fluid impermeable material as neoprene or the rubberized fabric usually employed in the art. The diaphragm is provided with the pressure plate or button 19 formed with the internally threaded boss 20 into which the end of stem 12 is screw threaded. The stem may be securely retained in its operative position with the diaphragm plate by means of a set screw inserted at 21. The upper diaphragm casing is formed with the port 22 communicating with the pipe fitting 23 through which the controlling fluid, such as air, is admitted.

The lower diaphragm support member 15, as shown, is of general frusto-conical shape and is formed at its lower end with the integral tubular extension 24 the bore of which is screw threaded to receive the extension 9 of the valve body. The diaphragm support 15 is also associated with the thimble 25. The thimble connects with the side wall of the diaphragm support 15 through the lateral flange 26. The thimble is connected to the flange 26 and casing 15 in any suitable manner, as by welding, to form an integral unit or preferably, as shown, is cast integrally with the flange and the diaphragm support 15. As will be observed, the top of the thimble is apertured at 27 to permit reciprocation of the valve stem and to establish an upper guide for the stem.

The valve shown in the drawing is of the direct acting type, that is one in which air or other controlling fluid is admitted to the diaphragm chamber to close the valve and in which the valve is constantly urged to the open position by means of the spring. It will be appreciated that the superstructure may be associated with an appropriately designed valve body and valve plug so as to function as effectively as a reverse acting valve. As shown, the spring 28 encircles the thimble 25 which latter thus serves as a positioning means for the spring. The lower end of the spring abuts the flange 26 and the upper end abuts the spring adjusting button or nut 29 which is threaded on the upper circular portion of the valve stem 12. The nut is preferably formed with a peripheral groove 30 on the lower surface to receive the upper convolution of the spring. The nut is serrated or knurled as at 31 so as to facilitate application of a tool to rotate the nut and thereby adjust the tension of the spring to the desired value.

As indicated previously, a salient object of the invention is to interpose a bellows seal between the valve stem and the valve body in such a manner as to preclude either a positive or inadvertently applied torsional stress to the diaphragm. With such a concept in view it will be appreciated that many different specific designs may be developed which subserve this desirable function. That shown in the drawing is as effective as it is simple and is illustrative of any mechanism or design that achieves the same ultimate result.

As will be observed from an inspection of Fig. 1, the valve stem, in effect, is comprised of two integral sections of different cross-sectional configuration. The upper portion 32 is circular in cross-section while lower portion 33 is non-circular in cross-section and is surrounded by a similarly shaped sleeve 33' which together are adapted to reciprocate in a guide 34, the cross-section of the bore of which conforms to the cross-section of the sleeve 33' of the section 33. As illustrated in the drawing, this non-circular section is polygonal and specifically is hexagonal in cross-section. The bore of the stem guide, as explained, similarly is hexagonal in cross-section. With this type of construction the stem 12 may freely reciprocate in guide 34 but cannot rotate or twist relatively to the guide since the non-circular contiguous surface of the guide establishes a positive abutment to such rotative movement. If a bellows is attached either directly or indirectly to the fixed guide 34 it is apparent that no substantial torsional stress can be transmitted from the stem to the bellows.

A polygonal cross-section, as will be appreciated, permits the desired change in cross-section of the stem by simple machining methods and is thus a preferred design. It will be appreciated, however, that the invention comprehends broadly the establishment of non-circular contiguous surfaces between a portion of the valve stem and the fixed guide to which the bellows is directly or indirectly attached. It is thus apparent that the non-circular section of the stem may be of any desired cross-section provided it is not circular, thus it may be elliptical in cross-section or it may be of generally tubular cross-section and formed with one or more vertical flat or angular faces or any such discontinuity from a circular cross-section. When such a stem is associated with a guide the bore of which is of similar cross-sectional configuration relative rotation between the stem and guide is prevented.

The guide member 34 is formed with the central tubular extension or boss 35 and with the lateral extending flange 36. In assembled position the stem guide is held securely in position between the upper rim of the tubular extension 9 and in the lower face of the flange 26 of the lower diaphragm casing. If desired, suitable gaskets may be interposed between the guide 34 and the flange 26. The packless seal, as intimated previously, is established by the expansible-contractible metallic bellows 37. The lower end of the bellows is attached to the vertical face of the boss 35 by suitable means such as a soldered or brazed joint so as to insure a fluid tight seal. The upper end of the bellows similarly is soldered or otherwise metal bonded to the disc or ring 38 fixed on the stem 12. The bellows may be of any desired type of construction, such as a single or multiple walled unit of stainless steel or other high alloy steels, non-ferrous alloys, such as suitable brasses or bronzes and the like.

It will be observed that the valve structure described is eminently compact and is of simplified and rugged structure. The motor superstructure is directly mounted on the valve body and thus eliminates the usual elongated intermediate barrel structure. This compactness with its concommitants of lighter weight and low silhouette is attained while insuring increased or prolonged operation efficiency by reason of the effective protection accorded the bellows seal. The provision of the thimble or barrel 25 mounted within the casing contributes materially to the efficiency and compactness of the structure.

This barrel not only houses and thus protects the silphon or bellows but serves additionally as an upper guide for the diaphragm and as a centering means for the diaphragm spring while contributing to the structural strength of the lower diaphragm casing. The described association of the thimble with the bellows seal and the novel correlation of a valve stem having a surface so conformed as to preclude any rotative movement thus insures the maximum protection for the bellows seal.

It will be appreciated that the novel design of the superstructure with its embodied fluid tight bellows seal has a wide permissive range of use and is not limited in its technological application in an assemblage with the valve body as shown. The superstructure is so designed, as explained, that by the simple expedient of changing the form of the plug and substituting a properly standardized valve body the unit can be converted quickly to an indirect acting valve. If desired, the improved superstructure may be adapted for use with rotating as well as reciprocating valve elements. This may be achieved by translating the reciprocating motion of the effectively sealed diaphragm stem 12 to rotary motion and utilizing such rotary motion to actuate any desired type of rotary valve. Therefore, while a preferred modification of the invention has been shown and described it is to be understood that this is given didactically to explain the underlying principles involved and not as limiting the comprehensive scope or utility of the invention except as such limitations are clearly imposed by the appended claims.

I claim:

1. A fluid control valve structure comprising a valve casing having a chamber for fluid and inlet and outlet passages for the flow of fluid through the chamber, a diaphragm casing, a lower diaphragm support member, a flexible diaphragm mounted between said casing and support member, means to secure the support member directly to the valve body, a diaphragm stem having a valve member connected thereto and disposed within the chamber for controlling the flow of fluid through the chamber, an elongated tubular member attached to the support member enclosing a portion of the stem and serving as an upper guide for the stem, a stem spring enclosing the tubular member, a spring button adjustably mounted on the stem above the said tubular member, a lower guide for the stem secured between the valve casing and the diaphragm support member and a flexible sealing means housed within the tubular member and fixed at one end to the stem and at the other to said lower guide.

2. A diaphragm valve superstructure which comprises, an upper dish-shaped diaphragm casing, a lower diaphragm support member, a flexible diaphragm mounted therebetween and defining with the upper casing a chamber for the controlling fluid, a stem connected with the diaphragm and movable therewith, an adjustable spring button on the stem, a tubular barrel rigidly secured to the lower diaphragm support and within the interior thereof through which the stem projects, the upper section of the barrel serving as a stem guide, a stem spring enclosing the barrel and retained between the spring button and the lower section of the diaphragm support casing and a bellows seal secured to the stem at one end and at the other end to a part held in fixed position by the lower diaphragm support and mounted in enclosed position within the said barrel.

3. A diaphragm valve superstructure which comprises, a dish-shaped diaphragm casing, a lower diaphragm support including a continuous circular upper flange, a lower tubular extension integrally connected with the upper flange by spaced wall sections, a diaphragm mounted between the diaphragm casing and the said upper flange of the diaphragm support and defining with the diaphragm casing a pressure chamber for the admission of a controlling fluid, a diaphragm stem connected to the diaphragm and movable therewith; an upwardly extending spring barrel integrally attached to the lower tubular extension of the diaphragm support and formed with a stem guide at its upper end, an adjustable spring button threaded on the stem above the barrel, a stem spring mounted between the spring button and the said lower tubular extension and enclosing the barrel, a lower stem guide positioned at the base of the barrel, a bellows seal member housed completely within the barrel, said seal being attached at one end to the stem and at the other to the lower stem guide.

4. A diaphragm valve superstructure which comprises, a dish-shaped diaphragm casing, a lower diaphragm support including a continuous circular upper flange, of substantially the same diameter as the diaphragm casing, a lower tubular extension of less diameter than the said upper flange and integrally connected with the upper flange by spaced wall sections, a diaphragm mounted between the diaphragm casing and the said upper flange of the diaphragm support and defining with the diaphragm casing a pressure chamber for the admission of a controlling fluid, a diaphragm stem connected to the diaphragm and movable therewith; an upwardly extending spring barrel integrally attached to the lower tubular extension of the diaphragm support and formed with a stem guide at its upper end, an adjustable spring button threaded on the stem above the barrel, a stem spring mounted between the spring button and the said lower tubular extension and enclosing the barrel, a lower stem guide positioned at the base of the barrel, a bellows seal member housed completely within the barrel, said seal being attached at one end to the stem and at the other to the lower stem guide.

BRADFORD G. WOOLLEY.

REFERENCES CITED

The following references are of record in the file of this patent:

UNITED STATES PATENTS

| Number | Name | Date |
| --- | --- | --- |
| 774,985 | Jones | Nov. 15, 1904 |
| 1,289,434 | Fulton | Dec. 31, 1918 |
| 1,328,277 | Fulton | Jan. 20, 1920 |
| 1,891,547 | Kriehbaum | Dec. 20, 1932 |
| 2,158,715 | Beekley | May 16, 1939 |
| 2,356,748 | Bounton | Aug. 29, 1944 |